(12) United States Patent
Kim et al.

(10) Patent No.: US 8,336,341 B2
(45) Date of Patent: Dec. 25, 2012

(54) TUB FOR A WASHING MACHINE WITH A BEARING HOUSING

(75) Inventors: Hyeok Deok Kim, Changwon-si (KR); Byung Hwan Ahn, Gimhae-si (KR); Hung Myong Cho, Gimhae-si (KR)

(73) Assignee: LG Electronics Inc., Seoul (KR)

( * ) Notice: Subject to any disclaimer, the term of this patent is extended or adjusted under 35 U.S.C. 154(b) by 105 days.

(21) Appl. No.: 12/300,484

(22) PCT Filed: May 12, 2006

(86) PCT No.: PCT/KR2006/001788
§ 371 (c)(1),
(2), (4) Date: Nov. 12, 2008

(87) PCT Pub. No.: WO2007/132953
PCT Pub. Date: Nov. 22, 2007

(65) Prior Publication Data
US 2009/0107187 A1    Apr. 30, 2009

(51) Int. Cl.
*D06F 13/00*    (2006.01)
*D06F 21/00*    (2006.01)
*D06F 23/00*    (2006.01)
*D06F 25/00*    (2006.01)

(52) U.S. Cl. ............... 68/140; 68/133; 68/139; 68/157; 68/210

(58) Field of Classification Search ............ 68/140, 68/139, 157, 210, 133
See application file for complete search history.

(56) References Cited

U.S. PATENT DOCUMENTS

| 4,216,663 | A | * | 8/1980 | Shacklock .................. 68/3 R |
|---|---|---|---|---|
| 5,040,285 | A | * | 8/1991 | Williams et al. ................ 29/596 |
| 5,862,686 | A | * | 1/1999 | Skrippek ..................... 68/140 |
| 6,257,027 | B1 | * | 7/2001 | Imai .......................... 68/12.12 |
| 6,279,357 | B1 | * | 8/2001 | Didlick et al. ................ 68/20 |
| 6,460,382 | B1 | * | 10/2002 | Kim et al. ................... 68/140 |
| 6,477,869 | B2 | * | 11/2002 | Heyder et al. ................ 68/140 |
| 6,901,778 | B2 | * | 6/2005 | Kim et al. ................... 68/23.6 |
| 6,918,271 | B2 | * | 7/2005 | Lim et al. .................... 68/23.2 |
| 7,418,843 | B2 | * | 9/2008 | Kim et al. ................... 68/140 |
| 2003/0000263 | A1 | * | 1/2003 | Kim et al. ................... 68/23.7 |
| 2004/0163428 | A1 | * | 8/2004 | Kim et al. ................... 68/140 |
| 2006/0059957 | A1 | * | 3/2006 | Kim ........................... 68/12.24 |

(Continued)

FOREIGN PATENT DOCUMENTS

EP    1 428 924 B1    1/2008

(Continued)

OTHER PUBLICATIONS

Merriam Webster's Online Dictionary: Flat. <http://www.merriam-webster.com/dictionary/flat?show=0&t=1300736874> Mar. 21, 2011.*

(Continued)

*Primary Examiner* — Michael Kornakov
*Assistant Examiner* — Katelyn Whatley
(74) *Attorney, Agent, or Firm* — KED & Associates, LLP (57) ABSTRACT

A tub (100) for a washing machine, and a washing machine comprising the same are disclosed. The tub (100) is formed through injection molding with a bearing housing (200) inserted therein, and a washing machine comprises the same. Here, the bearing housing (200) comprises a bearing support (201) to receive bearings, and a flange (210) extended radially from the bearing support (201) and having radial ribs (230).

20 Claims, 6 Drawing Sheets

U.S. PATENT DOCUMENTS

2006/0096329 A1 * 5/2006 Kim et al. .................. 68/3 R

FOREIGN PATENT DOCUMENTS

| KR | 10-1998-043343 | | 9/1998 |
|----|----------------|---|---------|
| KR | 1019980043343 | * | 9/1998 |
| KR | 10-2005-0053211 | | 12/2003 |
| KR | 10-2005-0073219 | | 7/2005 |

OTHER PUBLICATIONS

International PCT Search Report dated Mar. 2, 2007.
Korean Notice for Submission of Opinion dated Jul. 1, 2010 for Application No. 10-2008-7025898 and English language translation.
Korean Notice of Allowance dated Nov. 8, 2010 for Application No. 10-2008-7025898 and English language translation.

* cited by examiner

TUB FOR A WASHING MACHINE WITH A BEARING HOUSING

TECHNICAL FIELD

The present invention relates to a tub for a washing machine and a washing machine comprising the same. More particularly, the present invention relates to a tub formed through injection molding with a bearing housing inserted therein, and a washing machine comprising the same. Here, the bearing housing comprises a flange having radial ribs.

BACKGROUND ART

Generally, washing machines perform washing operation, rinsing operating, spin-drying operation, and the like through rotation of a rotational tub and a pulsator via driving force of a motor. Upon washing operation, water and laundry in the rotational tub are agitated such that the laundry is washed via friction between the laundry and the tub as well as the water. The washing machines can be classified into pulsator type washing machines, agitator type washing machines, drum type washing machines, and the like according to manners of washing operation.

In particular, the drum type washing machines can be classified into an indirect-coupled type in which driving force of a motor is indirectly transferred to a drum via a belt wound around a motor pulley and a drum pulley, and a direct-coupled type in which the driving force is directly transferred to the drum via a rotor of a BLDC motor which is directly coupled to the drum.

For the indirect-coupled type, as the driving force of the motor is not directly transferred to the drum, but indirectly transferred thereto through the belt wound around the motor pulley and the drum pulley, there are problems in that energy waste and noise generated during transfer of the driving force are excessive.

Currently, there is an increasing tendency of using the direct-coupled type drum washing machine which employs the BLDC motor in order to solve the problems of the conventional drum washing machines.

The construction of the direct-coupled type drum washing machine will be described briefly in one example of conventional washing machines with reference to FIG. 1 as follows.

Figure 1:
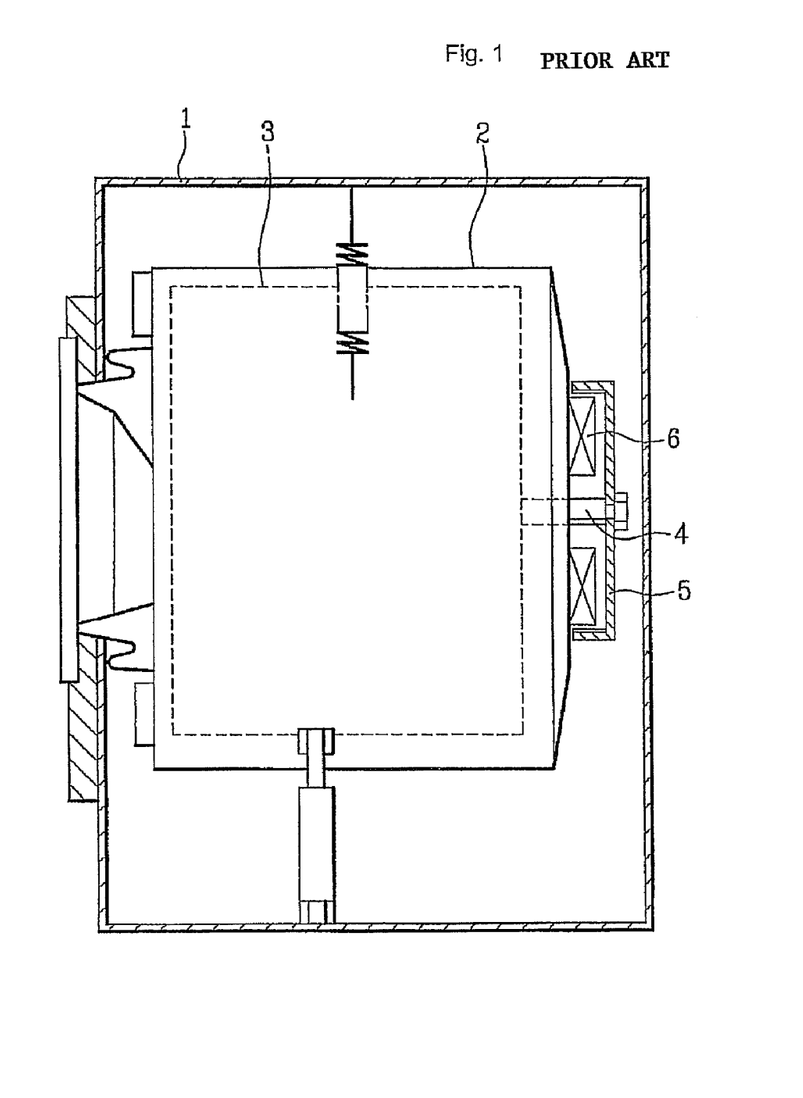
FIG. 1 is a longitudinal section view illustrating a invention direct-coupled type drum washing machine.

FIG. 1 is a longitudinal section view of the convention drum washing machine which comprises a tub 2 installed within a cabinet 1, and a drum rotatably installed coaxially in the tub 2.

The tub 2 is provided at a rear side with a motor which comprises a stator 6 and a rotor 5. The stator 6 is fixed to a rear wall of the tub 2, and the rotor 5 surrounding the stator 6 penetrates the tub 2 and is then coupled to the drum 3 via a shaft.

Figure 2:
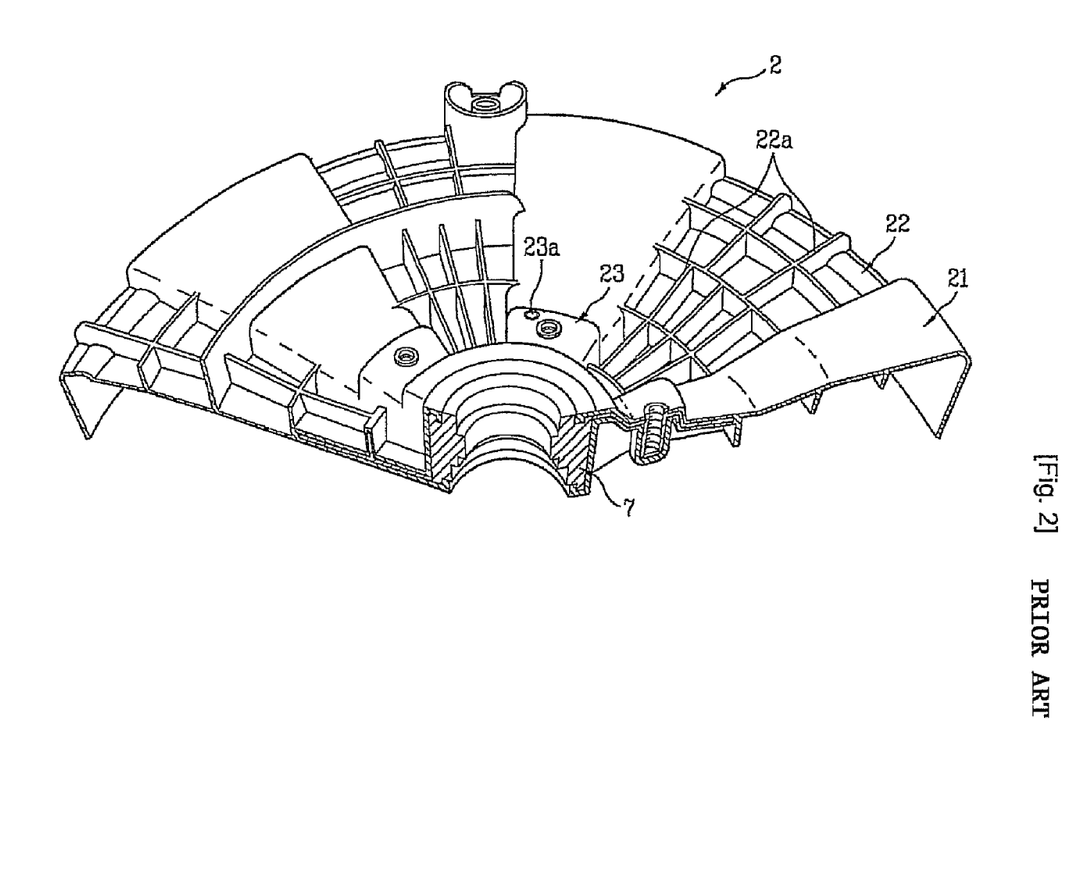
FIG. 2 is a partially cut perspective view illustrating a part of a rear wall of a tub of the direct-coupled type drum washing machine.

FIG. 2 is a partially cut perspective view illustrating a part of the rear wall of the tub.

The rear wall of the tub 2 is provided at its center with a metallic bearing housing 7, which can support bearings positioned on an outer periphery of both ends of a shaft 4, and receives the stator 6 fastened thereto.

The rear wall of the tub 2 is formed with stepped sections 21 and non-stepped sections 22. Each of the stepped sections 21 has a stepped coupling portion 23 formed adjacent to the center of the tub 2 where the bearing housing is positioned, such that the stator 6 is coupled to the coupling portion 23. Each of the non-stepped sections 22 is provided with a reinforcing rib 22a.

Figure 3:
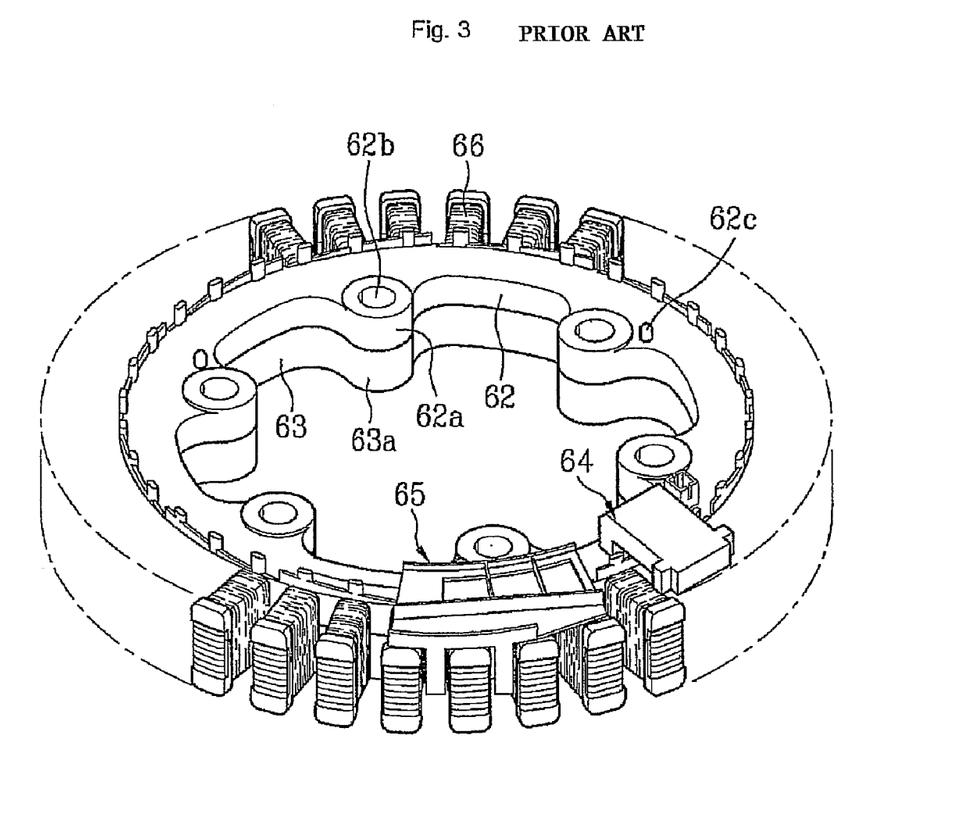
FIG. 3 is a perspective view illustrating the configuration of a stator of the direct-coupled type drum washing machine.

FIG. 3 is a perspective view illustrating the configuration of the stator 6. The stator 6 comprises a ring-shaped core 61 around which a coil 66 is wound, insulators 62 and 63, a hole sensor assembly 64, and a tab housing assembly 65 for connection with a power source.

Here, the insulators 62 and 63 comprise a first insulator 62 and a second insulator 63 formed to encase upper and lower surfaces of the core 6 as shown in the drawing. The insulators 62 and 63 have a plurality of bulges 62a and 63a formed on an inner side thereof so as to define fastening holes 62b and 63b therein, respectively.

The fastening holes 62b and 63b are fastened to the coupling portions 23 on the rear wall of the tub 2 by means of bolts.

Here, the upper surface of the first insulator 62 is formed with a plurality of positioning protrusions 62c adjacent to the bulges 62a to allow the stator 6 to be positioned on the rear wall of the tub when the stator 6 is coupled to the rear wall of the tub. Correspondingly, on the rear wall of the tub 2, the coupling portions 23 are formed with a plurality of positioning holes 23a in which the positioning protrusions 62c will be inserted, respectively.

Figure 4:
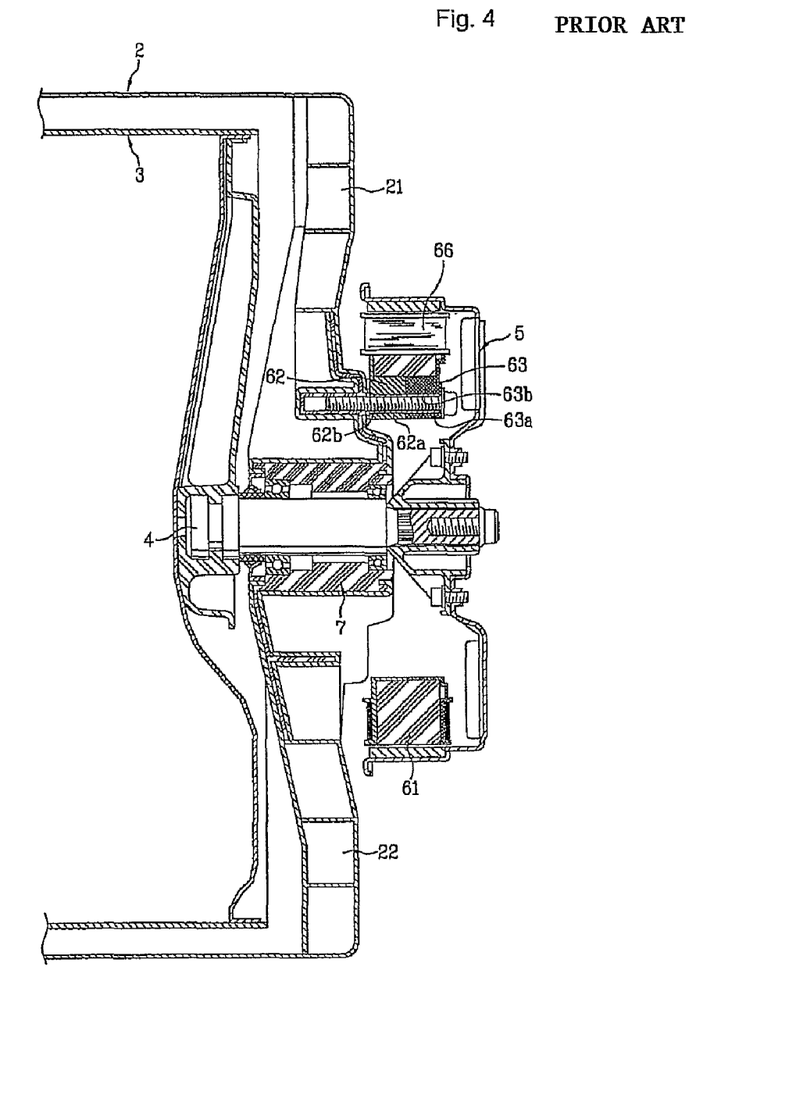
FIG. 4 is a longitudinal section view illustrating a coupled structure between the tub and the stator of the direct-coupled type drum washing machine.

For the washing machine in which the drum 2 is directly rotated by means of the BLDC motor, the stator 6 is directly mounted to a securing side on the rear wall of the tub 2 as shown in FIG. 4. When considering the weight of the stator 6, vibration thereof upon rotation of high speeds, and shaking and deformation of the rotor 5, a fastening portion between the stator 6 and the tub 2 is required to have a strong structure. In particular, for a large capacity drum washing machine which comprises a stator 6 having a weight of 1.5 kg or more, and has a rotational speed of 600~2,000 rpm upon spin-drying operation, it is necessary to have a higher structural strength.

Meanwhile, even for other types of washing machine as well as the direct-coupled type washing machine, the rear wall of the tub is required to have high strength and rigidity in the case where the bearing housing is inserted in the rear wall of the tub. The reason is that vibration of a rotational shaft serving to rotate the drum is transferred to the rear wall of the tub via the bearing housing, requiring the rear wall of the tub to have a sufficient structural strength.

Thus, if the tub is formed by injection molding with the bearing housing inserted therein, it is desirable that the bearing housing have a flange. The flange is designed to enhance the strength and rigidity of the rear wall of the tub. In addition, the flange serves to enhance coupling force between the bearing housing and the tub.

Accordingly, for the tub formed by the injection molding with the bearing housing having the flange inserted therein, the structure of the flange is very important. The flange must be designed in terms of the strength and rigidity of the rear wall of the tub, and the coupling force between the bearing housing and the tub. In addition, since the flange is inserted in the rear wall of the tub, the shape of the flange influences an inner volume of the tub, and in turn, influences a capacity of the washing machine. As such, when constructing the flange, various factors as mentioned above must be considered.

Further, the structure of the flange also influences manufacture of a mold for the tub as well as manufacture of a mold for the bearing housing. Thus, the flange must be designed to allow easy manufacturing of the mold therefor while reducing costs for manufacturing the mold. That is, the flange must have a simple structure in order to reduce the costs for the mold while allowing easy manufacturing thereof.

DISCLOSURE OF INVENTION

Technical Problem

An object of the present invention devised to solve the problem lies on a tub for a washing machine, which fulfills requirements as described above, and on a washing machine comprising the same.

It is another object of the present invention to provide the tub, which is formed by injection molding with a bearing housing inserted therein, has excellent strength and rigidity of a rear wall thereof, exhibits strong coupling with respect to the inserted bearing housing, and can reduce manufacturing costs, and to provide the washing machine comprising the same.

Technical Solution

The object of the present invention can be achieved by providing a washing machine comprising a tub formed by injection molding with a bearing housing inserted in the tub.

The bearing housing may comprise a bearing support to receive bearings; and a flange extending radially from the bearing support and having radial ribs.

Although the flange may have various shapes including a round shape, it has a flat shape for simple structure in this embodiment. If the flange has the flat shape, an inner surface of the rear wall of the tub is also flat so that an inner volume of the tub can be increased.

The radial ribs of the flange are formed radially. The radial ribs serve to reinforce the flange, and in turn, increase strength of the rear wall of the tub.

In addition, the radial ribs also serve to further increase coupling force between the bearing housing and the rear wall of the tub. For example, when manufacturing a plastic tub, molten plastic is injected into a cavity of a mold having the bearing housing inserted in the mold, and is then cooled, thereby producing the tub. In this regard, since the bearing housing is formed of a metallic material such as aluminum, adhesion between the bearing housing and the plastic is weak, and results in low coupling force between the bearing housing and the rear wall of the tub. In this regard, the radial ribs increase the coupling force therebetween.

The radial ribs are preferably formed on both sides of the flange.

The flange preferably further comprises a plurality of through-holes. With this structure, the molten plastic flows through the through-holes, and connects an inner side of the rear wall of the tub with an outer side thereof, thereby further increasing the coupling force between the flange and the bearing housing.

Each of the through-holes may have a slot shape or a circular shape.

The flange may further comprise a circumferential rib formed in a circumferential direction. The circumferential rib is preferably formed between the radial ribs to connect the radial ribs with each other. The circumferential rib is preferably formed on both sides of the flange.

In some cases, the circumferential rib and the radial ribs may not be formed on a surface which faces the inner side of the rear wall of the tub so that the inner side of the rear wall of the tub is not formed with protrusions, thereby allowing the tub to have an increased inner volume.

The circumferential rib and the radial ribs are preferably formed to cross each other. When the circumferential rib is formed to cross with the radial ribs, there is a merit in that the structure is simplified. Additionally, this structure can prevent concentration of stress. If the circumferential rib is not formed to cross with the radial ribs, the flange has an irregular shape, causing the concentration of stress.

Meanwhile, the flange may comprise bosses to fasten a stator of a motor for a direct-coupled type washing machine. For other types of washing machine, the bosses are not needed.

The bosses are preferably formed through the radial ribs or the circumferential rib. In either case, the ribs serve to reinforce the bosses.

More preferably, the bosses are formed at crossing portions between the circumferential rib and the radial ribs in order to further increase structural strength of the bosses.

The present invention as described above is applicable to a top-loading type washing machine to which laundry is loaded from above as well as a front-loading type washing machine as shown in FIGS. 1 to 4. In other words, the present invention is not limited to a specific type of washing machine.

Advantageous Effects

With this construction, the present invention can solve the problems of the conventional washing machine as described above, and provide the tub and the washing machine comprising the same, both of which fulfill the requirements as described above.

In addition, the present invention provides the tub which is formed by injection molding with a bearing housing inserted therein, has excellent strength and rigidity of a rear wall of the tub, exhibits strong coupling with respect to the inserted bearing housing, and can reduce manufacturing costs. Thus, the washing machine comprising the same has all characteristics of the tub according to the present invention.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

In following description, embodiments of the present invention will be described in relation to a front loading type drum washing machine which, as an example, is a direct-coupled type.

Figure 5:
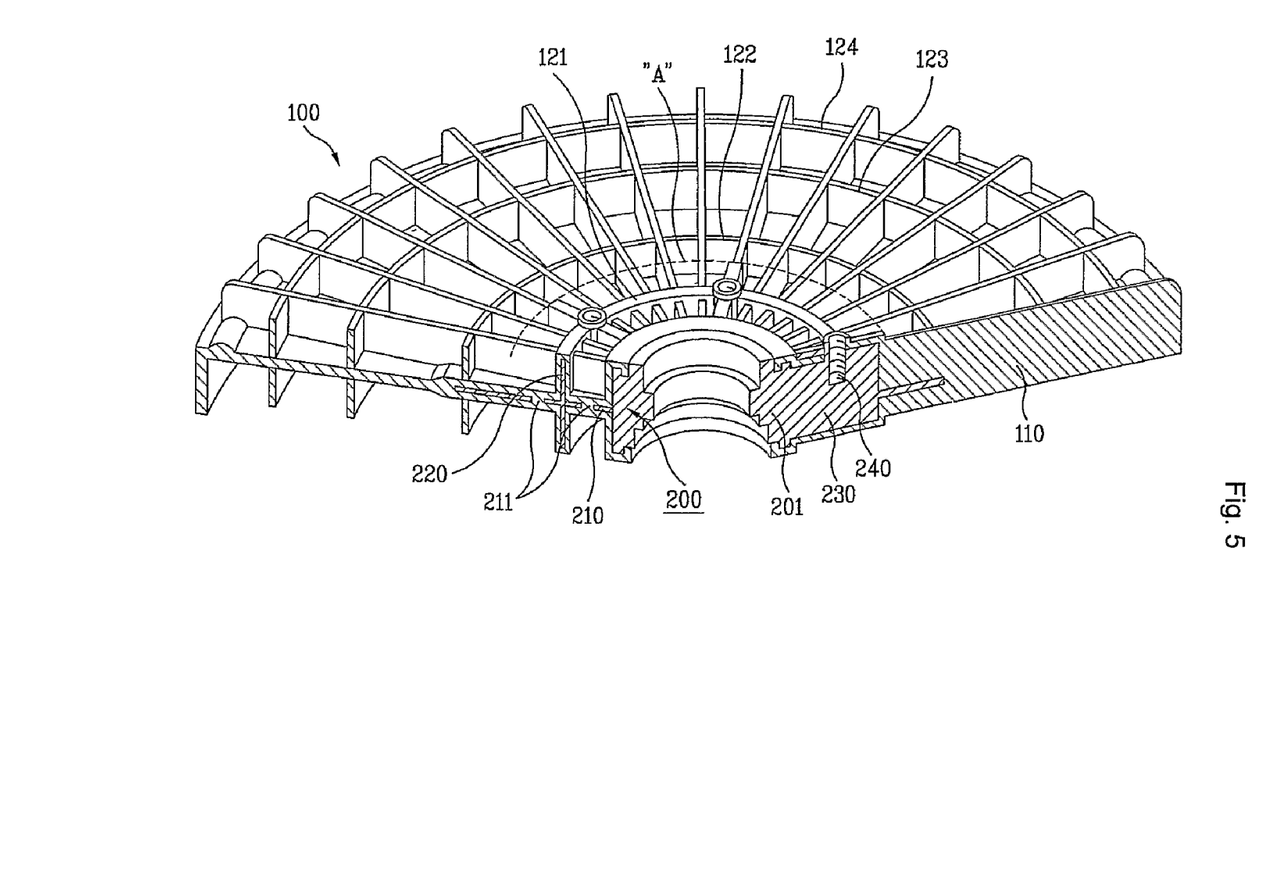
FIG. 5 is a partially cut perspective view illustrating a part of a rear wall of a tub in a direct-coupled type drum washing machine according to one embodiment of the present invention.

The front loading type drum washing machine according to the present invention is similar to the conventional drum washing machine shown in FIGS. 1 to 4. Exceptionally, the drum washing machine according to the present invention has a rear wall structure of a tub as shown in FIG. 5 instead of the structure shown in FIG. 2. Thus, the rear wall structure of the tub denoted by reference numeral 100 in FIG. 5 will be mainly described as a distinguishable structure from the conventional direct-coupled type washing machine. In addition, a bearing housing 200 shown in FIGS. 6 and 7 will be described as for a bearing housing which is inserted in the tub 100.

At first, as shown in FIG. 5, the tub 100 has the bearing housing 200 inserted in the rear wall thereof. The tub 100 is produced by plastic injection molding in such a way that the injection molding is performed after the bearing housing 200 is inserted in a mold for the tub. Specifically, after the bearing housing 200 is inserted in the mold for the tub 200, molten plastic is injected into a cavity of the mold, and is then cooled, thereby producing the tub 100 having the bearing housing 200 integrally inserted therein.

Figure 6:
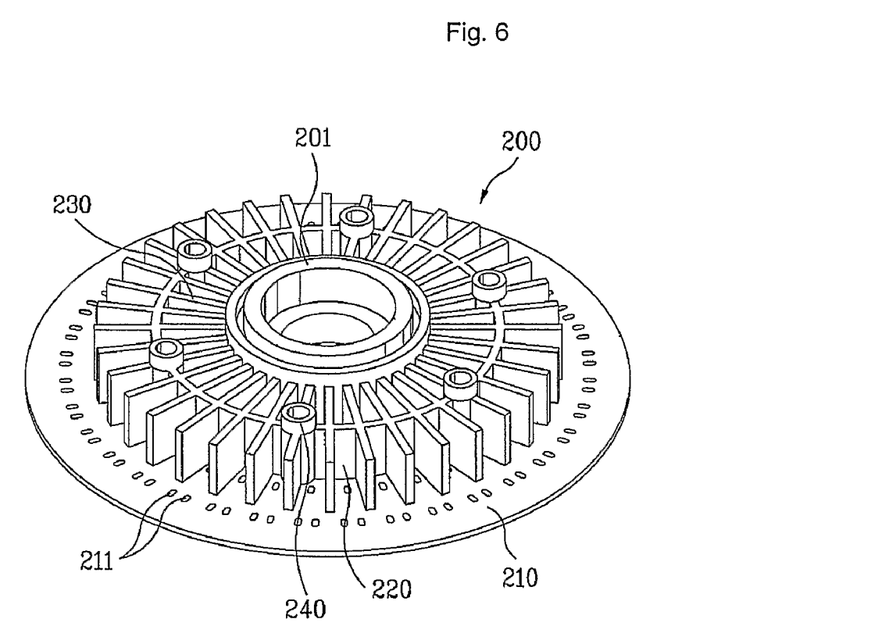
FIG. 6 illustrates a bearing housing inserted in the tub shown in FIG. 5.
Figure 7:
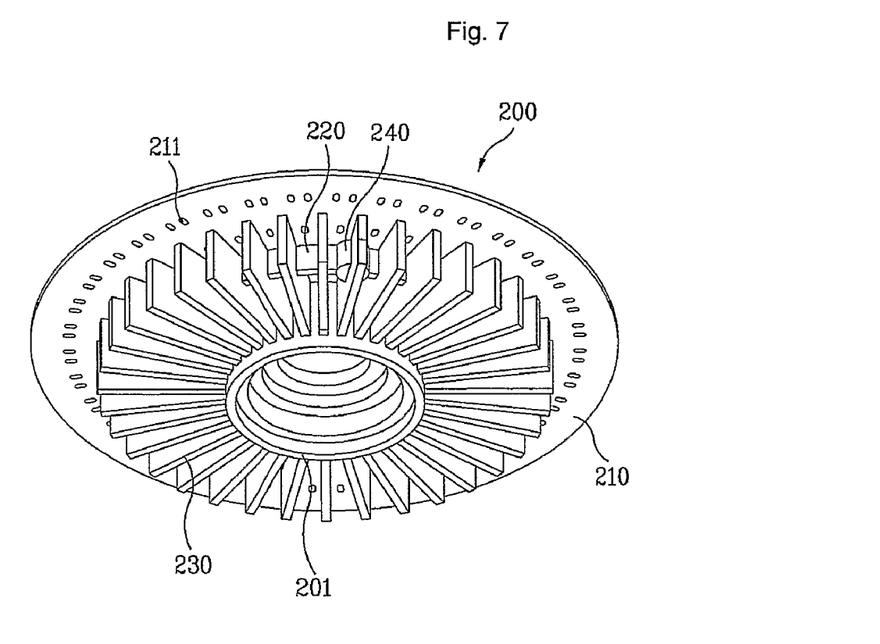
FIG. 7 illustrates a face of the bearing housing shown in FIG. 6 corresponding to an inner side of the rear wall of the tub.

The bearing housing 200 is shown in FIGS. 6 and 7, in which FIG. 6 shows one side of the bearing housing 200 corresponding to an outer side of the rear wall of the tub 100 and allowing a motor to be fastened thereto, and FIG. 7 shows the other side of the bearing housing 200 corresponding to an inner side of the rear wall of the tub 100.

As shown in the drawings, the bearing housing 200 comprises a bearing support 201 in which bearings (not shown) are positioned, and a flange 210 extending from the bearing support 201. Although the flange 210 is shown as being flat in this embodiment, the flange 210 may have other shapes. When the flange 210 has a flat shape, there are merits in easy manufacturing due to its simple structure, and in a large inner volume of the tub 100 due to its influence on an inner side of the rear wall of the tub 100. The entire flange 210 may extend perpendicular to a central axis of the bearing support 201.

The flange 210 comprises radial ribs 230 formed radially, and a circumferential rib 220 formed circumferentially between the radial ribs 230. Either the circumferential rib 220 or the radial ribs 230 can assist reinforcement of the flange in itself. However, since the radial ribs 230 are connected with the circumferential rib 220 while the radial ribs 230 are connected with each other via the circumferential rib 220, strength of the flange is further enhanced.

Although the radial ribs 230 are shown as not extending to a distal end of the flange 210 in the drawings, it is needless to say that the radial ribs 230 can extend to the distal end thereof. If the radial ribs 230 are formed to extend to the distal end of the flange 210, there is a need that each radial rib 230 has a profile having at least two steps in preparation of fastening with the stator according to cases.

The flange 210 comprises bosses 240 to fasten the stator. In this embodiment, each of the bosses 240 is positioned at a crossing portion between the circumferential rib 220 and an associated radial rib 230. The circumferential rib 220 and the radial rib 230 around each boss 240 increase structural strength of the boss 240.

In addition, the flange 210 comprises through-holes 211 for enhancing coupling force between the flange and the rear wall of the tub 100. The molten plastic flows through the through-holes 211, and connects the inner side of the rear wall of the tub 100 with the outer side thereof, so that the coupling force between the rear wall of the flange 100 and the bearing housing 200 is increased.

Each of the through-holes 211 has a slot shape or a circular shape. Preferably, the through-holes 211 have the slot shape. In addition, the through-holes 211 are uniformly arranged along each of plural circumferences on the flange 210. Uniform arrangement is required to prevent concentration of load on a specific part.

The tub 100 shown in FIG. 5 is provided with the bearing housing 200 integrally inserted therein, and comprises circumferential ribs 121 to 124, and radial ribs 110.

Among the circumferential ribs 121 to 124, the innermost circumferential rib 121 is thickest. In addition, in each of the radial ribs 110, an inner part positioned inside dotted line A is thicker than an outer part. Since the part near the center is subjected to large vibration via the shaft of the motor, this part of each rib is required to be thick.

In this embodiment, the circumferential rib 220 of the bearing housing 200 is inserted in the circumferential rib 121 of the rear wall of the tub 100, while the radial ribs 230 of the bearing housing 200 are inserted in the radial ribs 110 of the tub inside the dotted line A.

On the rear wall of the tub 100, a portion of each radial rib 110 and the circumferential ribs 121~124 outside the dotted line A have lower heights than those inside the dotted line in order to allow the stator to be fastened thereto, as shown in FIG. 4. That is, this is for the purpose of preventing them from interfering with a coil part 66 (see FIG. 4) of the stator where a coil for the stator is wound, as shown in FIG. 4.

On the tub 100, the radial ribs 110 and the circumferential ribs 121~124 are formed to cross each other, and are arranged uniformly. Such crossing and uniform arrangements prevent load transferred to the rear wall of the tub 100 from being concentrated on a specific part, thereby preventing concentration of stress. In view of mechanics, such arrangements enable advantageous stress distribution at the rear wall of the tub 100.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention relates to a tub for a washing machine and a washing machine comprising the same. More particularly, the present invention relates to a tub formed through injection molding with a bearing housing inserted therein, and a washing machine comprising the same. Here, the bearing housing comprises a flange having radial ribs.

The present invention can solve the problems of the conventional washing machine as described above, and provide the tub and the washing machine comprising the same, both of which fulfills various requirements in the art.

According to the present invention, the tub is formed by injection molding with the bearing housing inserted therein so that it has excellent strength and rigidity of the rear wall thereof, exhibits strong coupling with respect to the inserted bearing housing, and reduces manufacturing costs. Thus, the washing machine has all the characteristics of the tub according to the present invention.

The invention claimed is:

1. A washing machine comprising a tub formed by injection molding with a bearing housing inserted in the tub, wherein the bearing housing comprises:
   a bearing support to receive bearings;
   a flange extending radially from an entire outer circumference of the bearing support and having radial ribs and circumferential ribs formed on the flange, wherein the flange has an entirely flat surface and extends perpendicular to a central axis of the bearing support, and wherein the radial ribs are uniformly elevated with respect to the surface of the flange; and a boss on the flange to attach a stator of a motor, wherein the boss is provided at a portion where one of the circumferential ribs intersects one of the radial ribs.

2. The washing machine according to claim 1, wherein the radial ribs are formed on both an upper side and a lower side of the flange.

3. The washing machine according to claim 1, wherein the flange has a plurality of through-holes.

4. The washing machine according to claim 3, wherein each of the through-holes has either a slot shape or a circular shape.

5. The washing machine according to claim 1, wherein the circumferential ribs are formed on both sides of the flange.

6. A tub for a washing machine, the tub being formed by injection molding with a bearing housing inserted in the tub, wherein the bearing housing comprises:

a bearing support to receive bearings;

a flange extending radially from an entire outer circumference of the bearing support and having radial ribs and circumferential ribs formed on the flange, wherein the flange is entirely flat and extends perpendicular to a central axis of the bearing support, wherein each of the radial ribs have a uniform top surface; and a boss on the flange to receive a stator of a motor, wherein the boss is provided at a portion where one of the circumferential ribs intersects one of the radial ribs, and the boss is wider than the one of the radial ribs.

7. The tub according to claim 6, wherein the radial ribs are formed on both an upper side and a lower side of the flange.

8. The tub according to claim 6, wherein the flange has a plurality of through-holes.

9. The tub according to claim 8, wherein each of the through-holes is either a slot shape or a circular shape.

10. The tub according to claim 6, wherein the circumferential ribs are formed on both sides of the flange.

11. The washing machine according to claim 1, wherein the circumferential rib is formed between the radial ribs.

12. The tub according to claim 6, wherein the circumferential rib is formed between the radial ribs.

13. The washing machine according to claim 1, wherein an innermost circumferential rib is thicker than other ones of the circumferential ribs.

14. The washing machine according to claim 1, wherein an innermost radial rib is thicker than other ones of the radial ribs.

15. The washing machine according to claim 1, wherein the radial ribs and the circumferential ribs are arranged uniformly.

16. A washing machine comprising:

a tub formed by injection molding, a bearing housing inserted in the tub, and a stator to attach to the bearing housing, wherein the bearing housing comprises:

a bearing support to receive bearings;

a bearing housing flange to extend radially from an entire outer circumference of the bearing support and having radial ribs and circumferential ribs formed on the bearing housing flange, wherein the bearing housing flange has an entirely flat surface and extends perpendicular to a central axis of the bearing support, and wherein the radial ribs are uniformly elevated with respect to the surface of the flange; and a boss on the bearing housing flange to attach to the stator, wherein the boss is provided at a portion where one of the circumferential ribs intersects one of the radial ribs, an innermost circumferential rib is thicker than other ones of the circumferential ribs, and an innermost radial rib is thicker than other ones of the radial ribs.

17. The washing machine according to claim 16, wherein the radial ribs are formed on both an upper side and a lower side of the flange.

18. The washing machine according to claim 16, wherein the flange has a plurality of through-holes.

19. The washing machine according to claim 18, wherein each of the through-holes has either a slot shape or a circular shape.

20. The washing machine according to claim 16, wherein the circumferential rib is formed on both sides of the flange.

* * * * *